United States Patent
Kozuka

(10) Patent No.: US 10,160,429 B2
(45) Date of Patent: Dec. 25, 2018

(54) STOPPING CONTROL DEVICE FOR VEHICLE

(71) Applicant: TOYOTA JIDOSHA KABUSHIKI KAISHA, Toyota-shi, Aichi-ken (JP)

(72) Inventor: Tomoyuki Kozuka, Sunto-gun (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/292,232

(22) Filed: Oct. 13, 2016

(65) Prior Publication Data

US 2017/0106840 A1 Apr. 20, 2017

(30) Foreign Application Priority Data

Oct. 16, 2015 (JP) .................. 2015-204822

(51) Int. Cl.
*B60T 7/12* (2006.01)
*B60T 7/22* (2006.01)
*B60T 13/14* (2006.01)
*B60T 13/68* (2006.01)
*B60T 8/48* (2006.01)

(52) U.S. Cl.
CPC .................. *B60T 7/22* (2013.01); *B60T 7/12* (2013.01); *B60T 13/142* (2013.01); *B60T 13/686* (2013.01); *B60T 8/4872* (2013.01)

(58) Field of Classification Search
CPC . B60T 7/12; B60T 7/22; B60T 8/4872; B60T 8/17558; B60T 13/20; B60T 13/142; B60T 13/686; B60K 2310/26
USPC .......................................................... 701/96
See application file for complete search history.

(56) References Cited

U.S. PATENT DOCUMENTS

| | | | |
|---|---|---|---|
| 6,339,740 B1* | 1/2002 | Seto .................. | B60K 31/0008 340/904 |
| 6,459,982 B1* | 10/2002 | Kobayashi ......... | B60K 31/0008 180/170 |
| 7,565,235 B2* | 7/2009 | Okada ...................... | B60T 7/12 701/51 |
| 8,078,382 B2* | 12/2011 | Sugano ................ | B60W 10/06 180/170 |

(Continued)

FOREIGN PATENT DOCUMENTS

| JP | 2003-034240 A | 2/2003 |
|---|---|---|
| JP | 2010100134 A | 5/2010 |

(Continued)

*Primary Examiner* — Thomas J Williams
(74) *Attorney, Agent, or Firm* — Sughrue Mion, PLLC

(57) ABSTRACT

Provided is a stopping control device for a vehicle, which is applied to a vehicle having a braking apparatus that affords braking forces to respective wheels by supplying high pressure working liquid to wheel cylinders provided on the respective wheels and an inter-vehicle distance controller that controls an inter-vehicle distance between the own vehicle and a preceding vehicle, and comprises a braking controller that is configured to control the braking apparatus to increase the braking forces afforded to the wheels when a demand for stopping the own vehicle is input from the inter-vehicle distance controller; the braking controller being configured to end increasing of the braking forces when it is determined that an actual baking force of the entire vehicle exceeds a reference braking force set in advance as a value for maintaining the own vehicle in a stopped state.

2 Claims, 4 Drawing Sheets

(56) References Cited

U.S. PATENT DOCUMENTS

| 9,393,938 B2* | 7/2016 | Maruyama | B60T 7/22 |
| 2003/0033073 A1* | 2/2003 | Kichima | B60K 31/0008 |
| | | | 701/96 |
| 2009/0072615 A1* | 3/2009 | Oosawa | B60T 8/3275 |
| | | | 303/113.1 |
| 2014/0350822 A1* | 11/2014 | Tsunekawa | B60T 7/12 |
| | | | 701/96 |
| 2016/0272205 A1 | 9/2016 | Kato | |

FOREIGN PATENT DOCUMENTS

| JP | 2012-206593 A | 10/2012 |
| JP | 2015-093629 A | 5/2015 |

* cited by examiner

STOPPING CONTROL DEVICE FOR VEHICLE

CROSS-REFERENCE TO RELATED APPLICATIONS

The disclosure of Japanese Patent Application No. JP 2015-204822 filed on Oct. 16, 2015 is incorporated herein by reference in its entirety.

BACKGROUND

1. Technical Field

The present disclosure relates to a stopping control device for a vehicle such as an automobile.

2. Description of the Related Art

As a travel control for a vehicle such as an automobile, there has hitherto been known an all vehicle speed ACC (adaptive cruise control) and the control is sometimes referred to "constant vehicle speed and inter-vehicle distance control for all vehicle speed range." In general, the all vehicle speed ACC includes a constant vehicle speed control, an inter-vehicle distance control and a stopping control. The inter-vehicle distance control and the stopping control are executed when respective preset conditions are satisfied during the constant vehicle speed control is being executed.

In the constant vehicle speed control, braking force and driving force of a vehicle are as necessary controlled so that the magnitude of a difference between an actual vehicle speed and a preset reference vehicle speed becomes equal to or less than a reference value. In the inter-vehicle distance control, a determination is made as to whether or not there is a preceding vehicle and when it is determined that there is a preceding vehicle, braking force and driving force of a vehicle are as necessary controlled so that the distance between the own vehicle and the preceding vehicle becomes within a predetermined range including a preset reference distance. Further, in the stopping control, the own vehicle is stopped by increasing the braking force of the own vehicle when the preceding vehicle stops and the distance between the own vehicle and the preceding vehicle becomes equal to or less than the preset reference distance, and the own vehicle is maintained in a stopped state.

For example, in Japanese Patent Application Laid-open No. 2015-93629, there is described a stopping control device configured to increase, when the vehicle is stopped by the stopping control, braking forces of the vehicle so as to suppress moving of the vehicle during an engine that is stopped by idling stop control is re-started. The braking force of the entire vehicle is increased so that it becomes a predetermined value that is a sum of a braking force for maintaining the vehicle in a stopped state and a braking force for counteracting a driving force generated during the period of time of re-starting the engine. When the braking force of the entire vehicle is increased to be the predetermined value, the vehicle can be prevented from moving during the period of time of re-starting the engine.

In the stopping control device described in the above-mentioned Japanese Patent Application Laid-open publication, as the braking force of the entire vehicle is increased until an increase amount of the braking force by the stopping control becomes a predetermined value that is preset to prevent the vehicle from moving, allophone may be generated due to flowing of high pressure working liquid. For example, when the stopping control is executed during braking operation is conducted by a driver and, accordingly, the braking force of the entire vehicle is increased so that it becomes a sum of a braking force generated by braking operation of the driver and the predetermined value, the braking force of the entire vehicle may become a very high value, which causes distinguishable allophone to be generated. Especially, when a braking apparatus includes an electric pump and the working liquid is pressurized to high pressure by means of the electric pump being driven when increasing the braking force of the entire vehicle by the stopping control, operational noise is also generated due to driving of the pump. Consequently, when a braking apparatus includes an electric pump as described above, allophone that is generated when increasing the braking force by the stopping control is more distinguishable as compared to where a braking apparatus includes an accumulator.

SUMMARY

It is an object of exemplary aspects of the present disclosure to reduce allophone than before that is generated due to flow of high pressure working liquid in a situation where braking operation by a driver and increasing of the braking force by the stopping control are simultaneously conducted.

According to one embodiment of the present disclosure, there is provided a stopping control device for a vehicle, which is to be applied to a vehicle having a braking apparatus that affords braking forces to respective wheels by supplying high pressure working liquid to wheel cylinders provided on the respective wheels and an inter-vehicle distance controller that controls an inter-vehicle distance between the own vehicle and a preceding vehicle, and comprises a braking controller that is configured to control the braking apparatus to increase the braking forces afforded to the wheels when a demand for stopping the own vehicle is input from the inter-vehicle distance controller.

The braking controller is configured to end increasing of the braking forces when it is determined that an actual baking force of the entire vehicle exceeds a reference braking force set in advance as a value for maintaining the own vehicle in a stopped state.

With the above-mentioned configuration, the braking apparatus is controlled to increase the braking forces afforded to the wheels when a demand for stopping the own vehicle is input from the inter-vehicle distance controller. Increasing of the braking forces is ended when it is determined that an actual baking force of the entire vehicle exceeds the reference braking force set in advance as the value for maintaining the own vehicle in the stopped state. Thus, increasing of the braking forces can be ended earlier as compared to a conventional stopping control device in which the braking force of the entire vehicle is increased until an increase amount of the braking force by the stopping control becomes a predetermined value that is preset to prevent the vehicle from moving in a situation where braking operation is conducted by a driver. Consequently, it is possible to prevent the working liquid from being unnecessarily pressurized to an excessive high pressure and, accordingly, to reduce a risk that allophone is generated due to flow of high pressure working liquid.

In one aspect of the present disclosure, the braking apparatus comprises an electric pump that is configured to pressurize the working liquid, and the braking controller is configured to drive the electric pump when supplying high pressure working liquid to the wheel cylinders and stop the electric pump when ending increasing of the braking forces.

According to the above-mentioned aspect, the electric pump is driven when supplying high pressure working liquid to the wheel cylinders and is stopped when ending increasing of the braking forces in response to the actual braking force of the entire vehicle exceeding the reference braking force. Thus, the electric pump can be stopped earlier than in a conventional stopping control device. Consequently, operating noise generated due to driving of the electric pump can be stopped earlier than in a conventional stopping control device.

DETAILED DESCRIPTION

A preferred embodiment of the present disclosure will be described in detail with reference to the accompanying drawings.

Figure 1:
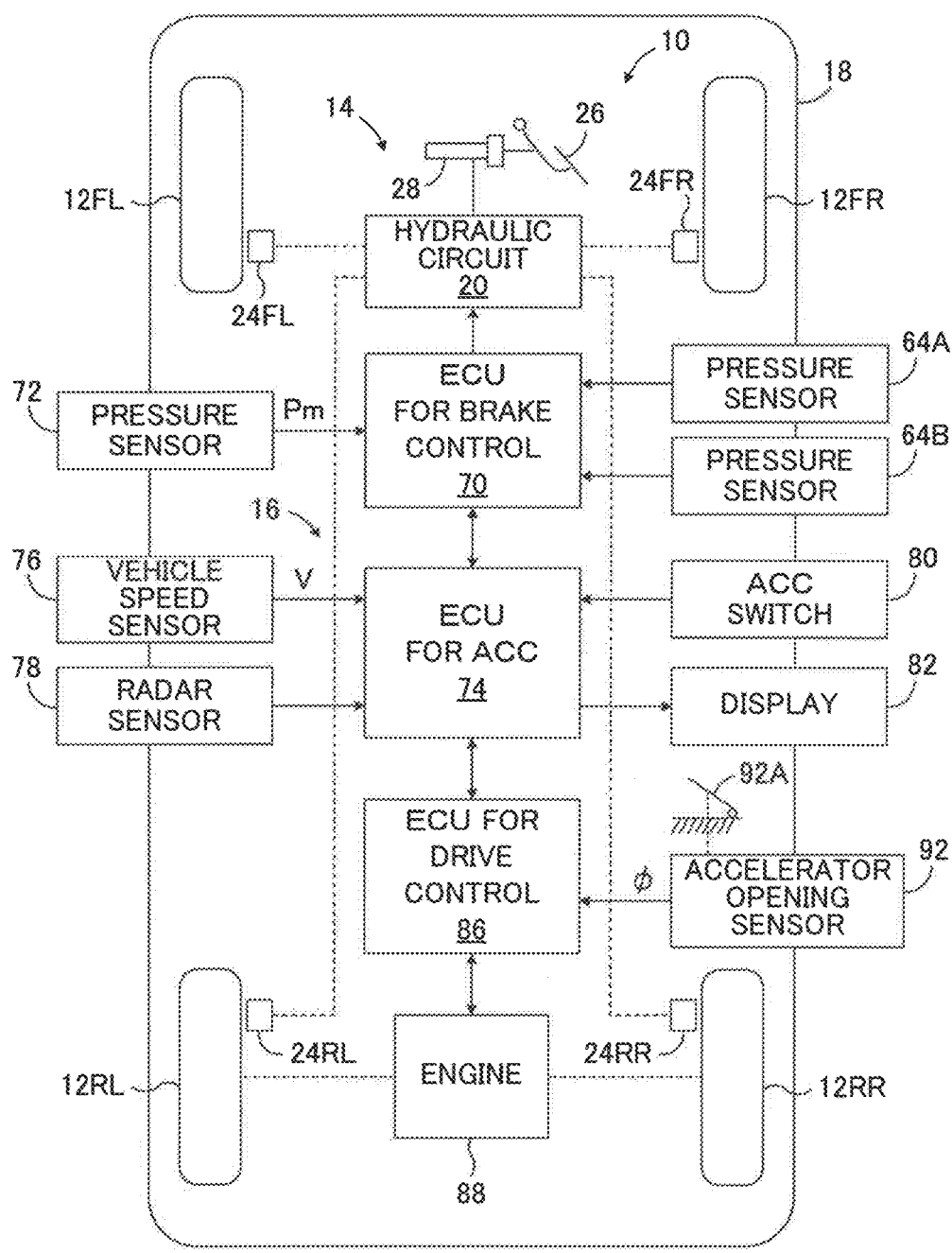
FIG. 1 is a schematic configuration diagram for illustrating a stopping control device for a vehicle according to an embodiment of the present disclosure.
Figure 2:
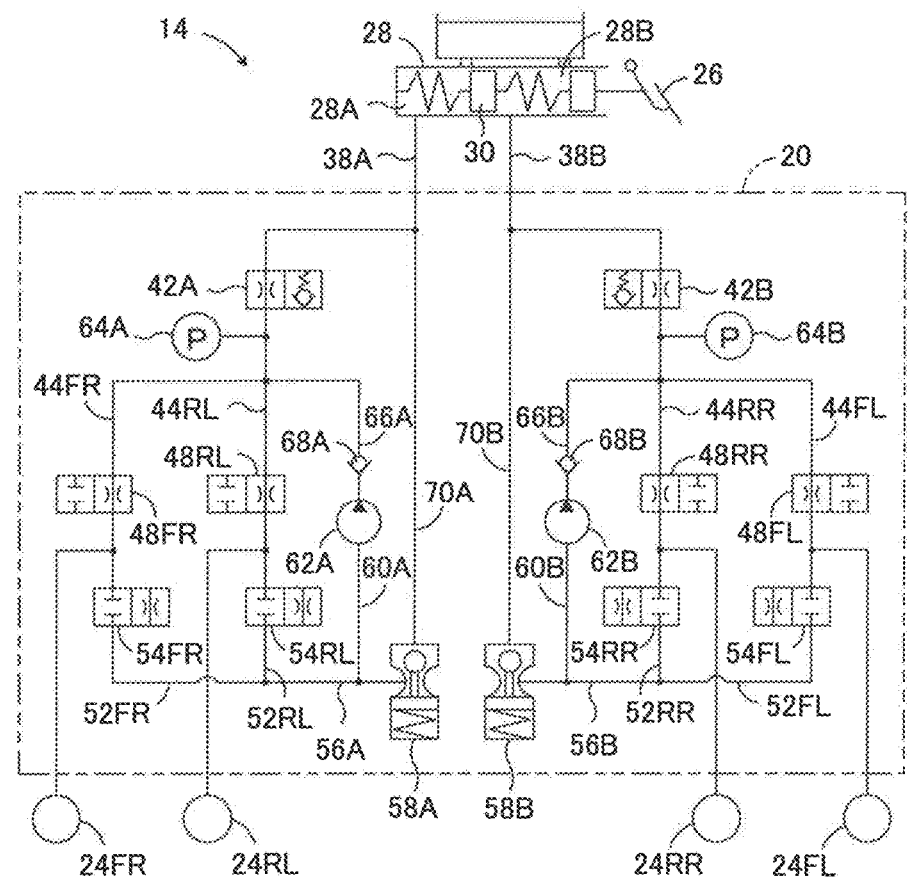
FIG. 2 is an illustration for illustrating the braking apparatus illustrated in FIG. 1.
Figure 3:
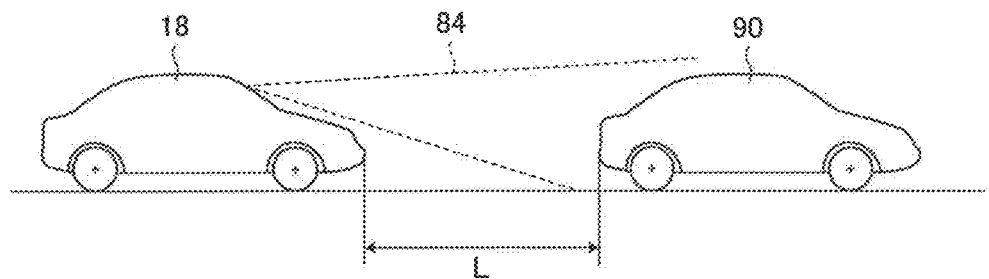
FIG. 3 is an illustration for illustrating an inter-vehicle distance control for controlling the distance between the own vehicle and a preceding vehicle.

FIG. 1 is a schematic configurational view showing a stopping control device 10 for a vehicle configured in accordance with an embodiment of the present disclosure and FIG. 2 is a diagram showing the braking apparatus illustrated in FIG. 1.

Referring to FIG. 1, the stopping control device 10 is applied to a vehicle 18 that comprises a braking apparatus 14 which affords braking forces to left and right front wheels 12FL, 12FR and left and right rear wheels 12RL, 12RR, and an inter-vehicle distance control device 16 which controls the distance between the own vehicle and a preceding vehicle. The left and right front wheels 12FL, 12FR are steerable wheels and, although not illustrated, are steered by a steering apparatus in response to steering operation of a steering wheel by a driver.

The braking apparatus 14 comprises a hydraulic circuit 20 serving as a braking actuator and wheel cylinders 24FL, 24FR, 24RL and 24RR provided on the wheels 12FL, 12FR, 12RL and 12RR, respectively. The braking apparatus 14 affords braking forces to the wheels and changes the braking forces by controlling internal pressures of respective wheel cylinders 24FL-24RR by the hydraulic circuit 20. As illustrated in FIG. 2, the braking apparatus 14 has a master cylinder 28 that supplies brake oil under pressure in response to a depressing operation of a brake pedal 26 by the driver. The master cylinder 28 has a first master cylinder chamber 28A and a second master cylinder chamber 28B sectioned by a free piston 30 urged into a predetermined position by a compression coil spring provided on each side of the free piston.

One end of a first system brake pressure control line 38A and one end of a second system brake pressure control line 38B are connected with the first master cylinder chamber 28A and the second master cylinder chamber 28B, respectively. The brake pressure control lines 38A and 38B connect the master cylinder chambers 28A and 28B with the hydraulic circuit 20.

The brake pressure control line 38A is provided with a first system communication control valve 42A, which is a solenoid valve of the normally open type in the illustrated embodiment. The communication control valve 42A opens when its solenoid not shown in FIG. 2 is not supplied with drive current and closes when the solenoid is supplied with drive current. In particular, when the communication control valve 42A is open, it maintains a pressure difference so that the pressure on the side opposite to the master cylinder 28 is higher than that on the side of the master cylinder 28 and varies the pressure difference incrementally and decrementally according to a voltage of the drive current.

In other words, when a pressure difference between the pressures on both sides of the communication control valve 42A is equal to or lower than a command pressure difference that is determined by a voltage of the drive current supplied to the solenoid, the communication control valve 42A maintains itself in the close condition. Thus, the communication control valve 42A prevents the oil serving as a working fluid from flowing from the side opposite to the master cylinder 28 toward the side of the master cylinder 28 via the communication control valve 42A to thereby prevent the pressure difference between the pressures on both sides of the communication control valve 42A from decreasing. By contrast, when the pressure difference between the pressures on both sides of the communication control valve 42A exceeds the command pressure difference, the communication control valve 42A opens. Thus, the communication control valve 42A allows the oil to flow from the side opposite to the master cylinder 28 toward the side of the master cylinder 28 via the communication control valve 42A to thereby control the pressure difference between the pressures on both sides of the communication control valve 42A to the command pressure difference.

Brake pressure control lines 44FR and 44RL for the right front and left rear wheels, respectively, are connected at their one ends to the other end of the first system brake pressure control line 38A. The brake pressure control lines 44FR and 44RL for the right front and left rear wheels, respectively, are connected at their other ends with wheel cylinders 24FR and 24RL for controlling braking forces of the right front and left rear wheels, respectively. Electromagnetic on-off valves 48FR and 48RL of the normally open type are provided midway in the brake pressure control lines 44FR and 44RL for the right front and left rear wheels, respectively.

An oil discharge line 52FR is connected at its one end to the brake pressure control lines 44FR between the electromagnetic on-off valve 48FR and the wheel cylinder 24FR. Similarly, an oil discharge line 52RL is connected at is one end to the brake pressure control lines 44RL between the electromagnetic on-off valve 48RL and the wheel cylinder 24RL. Electromagnetic on-off valves 54FR and 54RL of normally closed type are provided midway in the oil discharge lines 52FR and 52RL, respectively. The oil discharge lines 52FR and 52RL are connected at their other ends to a first system reservoir 58A for pooling the oil by a connecting line 56A.

As is apparent from the above, the electromagnetic on-off valves 48FR and 48RL are pressure increasing valves for selectively increasing and maintaining the pressures in the wheel cylinders 24FR and 24RL, respectively. By contrast, the electromagnetic on-off valves 54FR and 54RL are pressure decreasing valves for selectively decreasing the pressures in the wheel cylinders 24FR and 24RL, respectively. Thus, the electromagnetic on-off valves 48FR and 54FR cooperate with each other to define pressure increasing and decreasing valves, respectively, that selectively increase, decrease and maintain the pressure in the wheel cylinder 24FR of the right front wheel. Similarly, the electromagnetic on-off valves 48RL and 54RL cooperate with each other to serve as pressure increasing and decreasing valves, respectively, that selectively increase, decrease and maintain the pressure in the wheel cylinder 24RL of the left rear wheel.

The connecting line 56A is connected to the intake side of a pump 62A by a connecting line 60A. The discharge side of the pump 62A is connected to the other end of the brake pressure control line 38A by a connecting line 66A. The brake pressure control line 38A is provided with a pressure sensor 64A between the other end of the brake pressure control line 38A and the communication control valve 42A and the sensor detects a pressure Pa in the line. A check valve 68A is provided in the connecting line 66A and allows the oil to flow only in a discharge direction of the pump 62A.

In similar, the brake pressure control line 38B is provided with a second system communication control valve 42B, which is also a solenoid valve of the normally open type in the illustrated embodiment and operates similarly to the communication control valve 42A. Thus, by means of controlling the voltage of the drive current supplied to the solenoid not shown in FIG. 2, the oil can be restricted to flow from the side of the wheel cylinders 24FL and 24RR to the side of the master cylinder 28 via the communication control valve 42B and a pressure difference across the communication control valve 42B can be controlled to a command pressure difference.

Brake pressure control lines 44FL and 44RR for the left front and right rear wheels, respectively, are connected at their one ends to the other end of the second system brake pressure control line 38B. The brake pressure control lines 44FL and 44RR for the left front and right rear wheels, respectively, are connected at their other ends with wheel cylinders 24FL and 24RR for controlling braking forces of the left front and right rear wheels, respectively. Electromagnetic on-off valves 48FL and 48RR of the normally open type are provided midway in the brake pressure control lines 44FL and 44RR for the left front and right rear wheels, respectively.

An oil discharge line 52FL is connected at its one end to the brake pressure control lines 44FL between the electromagnetic on-off valve 48FL and the wheel cylinder 24FL. Similarly, an oil discharge line 52RR is connected at its one end to the brake pressure control lines 44RR between the electromagnetic on-off valve 48RR and the wheel cylinder 24RR. Electromagnetic on-off valves 54FL and 54RR of normally closed type are provided midway in the oil discharge lines 52FL and 52RR, respectively. The oil discharge lines 52FL and 52RR are connected at their other ends to a second system reservoir 58B for pooling the oil by a connecting line 56B.

As is apparent from the above, the electromagnetic on-off valves 48FL and 48RR are pressure increasing valves for selectively increasing and maintaining the pressures in the wheel cylinders 24FL and 24RR, respectively. By contrast, the electromagnetic on-off valves 54FL and 54RR are pressure decreasing valves for selectively decreasing the pressures in the wheel cylinders 24FL and 24RR, respectively. Thus, the electromagnetic on-off valves 48FL and 54FL cooperate with each other to define pressure increasing and decreasing valves, respectively, that serve to selectively increase, decrease and maintain the pressure in the wheel cylinder 24FL of the left front wheel. Similarly, the electromagnetic on-off valves 48RR and 54RR cooperate with each other to define pressure increasing and decreasing valves, respectively, that serve to selectively increase, decrease and maintain the pressure in the wheel cylinder 24RR of the right rear wheel.

The connecting line 56B is connected to the intake side of a pump 62B by a connecting line 60B. The discharge side of the pump 62B is connected to the other end of the brake pressure control line 38B by a connecting line 66B. The brake pressure control line 38B is provided with a pressure sensor 64B between the other end of the brake pressure control line 38B and the communication control valve 42B and the sensor detects a pressure Pb in the line. A check valve 68B is provided in the connecting line 66B and allows the oil to flow only in a discharge direction of the pump 62B. Notably, the pumps 62A and 62B may be electric pumps driven by a common electric motor, not illustrated in FIG. 1.

The reservoirs 58A and 58B are connected to the brake pressure control lines 38A and 38B between the master cylinder 28 and the communication control valves 42A and 42B by connecting lines 70A and 70B, respectively. Thus, the reservoirs 58A and 58B allow the oil to flow between the master cylinder chambers 28A, 28B and the reservoirs 58A, 58B, respectively, when the associated communication control valves 42A and 42B are closed. The reservoirs 58A and 58B have free pistons which are fixed with valve bodies of check valves, which prevent the oil volumes in the reservoirs 58A and 58B from exceeding a reference value.

According to the illustrated embodiment, each of the control valves and the on-off valves is set to a non-control position, as shown in FIG. 2, when no drive current is supplied to its solenoid. Accordingly, the pressure in the first master cylinder chamber 28A is supplied to the wheel cylinders 24FR and 24RL, and the pressure in the second master cylinder chamber 28B is supplied to the wheel cylinders 24FL and 24RR. Therefore, during normal operation, the pressure in the wheel cylinder of each wheel, i.e. the braking force generated thereby is selectively increased and decreased in accordance with the depression force on the brake pedal 26.

In contrast, when the pumps 62A and 62B are driven in a state where the communication control valves 42A and 42B are switched to a closed position and the on-off valves of the wheels are in the positions shown in FIG. 2, the oil in the reservoirs 58A and 58B is pumped up by the pumps. Accordingly, the pressure generated by the pump 62A is supplied to the wheel cylinders 24FR and 24RL, and the pressure generated by the pump 62B is supplied to the wheel cylinders 24FL and 24RR. Therefore, the brake pressure of each wheel is selectively increased and decreased by selectively opening and closing the communication control valves 42A and 42B and the on-off valve (pressure increasing and decreasing valve) of each wheel and controlling the operations of the pumps 62A and 62B regardless of the depression force on the brake pedal 26.

In this case, the pressure in each wheel cylinder is increased when the on-off valves 48FR-48RL and the on-off valves 54FR-54RL are in non-control positions shown in FIG. 2 (pressure increasing mode). The pressure in each wheel cylinder is maintained when the on-off valves 48FR-48RL are switched to closed positions and the on-off valves 54FR-54RL are in non-control positions shown in FIG. 2 (pressure maintaining mode). The pressure in each wheel cylinder is decreased when the on-off valves 48FR-48RL are switched to closed positions and the on-off valves 54FR-54RL are switched to open positions (pressure decreasing mode).

The communication control valves 42A and 42B, the on-off valves 48FR-48RL, the on-off valves 54FR-54RL, and electric motors for driving the pumps 62A and 62B are controlled as described hereinafter by an electronic control unit 70. The master cylinder 28 is provided with a pressure sensor 72 that detects a master cylinder pressure Pm and a signal indicative of the master cylinder pressure Pm detected by the pressure sensor 72 is input to the electronic control unit 70. Signals indicative of the pressures Pa and Pb detected by the pressure sensors 64A and 64B are also input to the electronic control unit 70. It is to be noted that in FIG. 1, "electronic control unit" is expressed as "ECU."

The electronic control unit 70 controls braking pressure of each wheel based on the master cylinder pressure Pm, to thereby control a braking force of each wheel in accordance with depression amount of the brake pedal 26, i.e., braking operation amount of the driver. As described in detail later, the electronic control unit 70 controls, as necessary, a braking force of each wheel based on a demand of an electronic control unit 74 for ACC included in the inter-vehicle distance control device 16.

As illustrated in FIG. 1, the electronic control unit 74 is supplied with a signal indicative of vehicle speed V detected by a vehicle speed sensor 76 and a signal indicative of information in front of the vehicle 18 detected by a laser sensor 78. The electronic control unit 74 is also supplied with a signal indicative of such information as to whether or not the inter-vehicle distance control is to be executed from an ACC switch 80 operated by the driver and displays the situation of the inter-vehicle distance control on a display unit 82. It is to be noted that information in front of the vehicle 18 may be detected by a camera such as a CCD camera, rader, or a combination of, for example, a laser sensor and a camera.

Although not illustrated in FIG. 1, the ACC switch 80 includes a start button for starting the inter-vehicle distance control, an end button for ending the inter-vehicle distance control, an inter-vehicle distance setting button for setting a reference inter-vehicle distance Lc and a vehicle speed setting button for setting a reference vehicle speed Vc. The electronic control unit 74 executes the inter-vehicle distance control in accordance with the settings of these buttons. That is, the electronic control unit 74 starts the inter-vehicle distance control when the start button is pressed and ends the inter-vehicle distance control when the end button is pressed. During the execution of the inter-vehicle distance control, the laser sensor 78 irradiates a laser beam 84 forward of the vehicle 18 and detects the reflected beam to acquire information in front of the vehicle 18.

When a difference $\Delta V$ (=V-Vc) between a vehicle speed V detected by the vehicle speed sendsor 76 and the reference vehicle speed Vc is a positive value larger than a reference value Va (a positive constant), the electronic control unit 74 outputs a braking demand as necessary to the electronic control unit 70 for brake control so as to decrease the vehicle speed difference $\Delta V$ to be equal to or less than the reference value Va. The electronic control unit 70, when receiving the braking demand, controls the braking apparatus 14 to increase braking forces of the wheels 12FL-12RR (braking force control for constant vehicle speed control.)

In contrast, when the vehicle speed difference $\Delta V$ is a negative value less than a reference value Vb (a negative constant), the electronic control unit 74 outputs a driving demand as necessary to an electronic control unit 86 for drive control so as to increase the vehicle speed difference $\Delta V$ to be equal to or more that the reference value Vb. The electronic control unit 86, when receiving the driving demand, controls an output of an engine 88 to increase driving forces of drive wheels that may be the front wheels 12FL and 12FR, the rear wheels 12RL and 12RR or the four wheels 12FL-12RR.

The electronic control unit 74 determines whether or not there is a preceding vehicle 90 based on the information in front of the vehicle that is detected by the laser sensor 78, and, when there being a preceding vehicle 90, estimates a distance L between the own vehicle 18 and the preceding vehicle 90. When a difference $\Delta L$ (=L-Lc) between a distance L and a reference distance Lc is a negative value less than a reference value La (a negative constant), the electronic control unit 74 outputs a braking demand to the electronic control unit 70 for brake control so as to increase the distance difference $\Delta L$ to be equal to or more that the reference value La. The electronic control unit 70, when receiving the braking demand, controls the braking apparatus 14 to increase braking forces of the wheels 12FL-12RR (braking force control for inter-vehicle distance control.)

In contrast, when the distance difference $\Delta L$ is a positive value more than a reference value Lb (a positive constant), the electronic control unit 74 outputs a driving demand to the electronic control unit 86 for drive control. The electronic control unit 86, when receiving the driving demand, controls an output of the engine 88 to increase driving forces of the drive wheels.

The electronic control unit 70, when receiving no braking demand, sets an operation mode of the braking apparatus 14 to a usual braking force control mode so as to control the braking forces of the wheels 12FL-12RR to be braking forces corresponding to the master cylinder pressure Pm. The electronic control unit 86, when receiving no driving demand, controls an output of the engine 88 based on an accelerator opening $\varphi$ detected by an accelerator opening sensor 92 provided on an accelerator pedal 92A. Reference may be made, if necessary, to Japanese Patent Application Laid-open No. 2003-34240 with regard to the above-described inter-vehicle distance control.

In addition, the electronic control unit 74 outputs a stopping demand and a demanded braking force increasing rate $\Delta Fv$ to the electronic control unit 70 for brake control when it is determined that a preceding vehicle 90 is stopped and the distance difference $\Delta L$ becomes equal to or less than a reference value $\Delta Ls$. Although the reference value $\Delta Ls$ and the demanded braking force increasing rate $\Delta Fv$ may be positive constants, they preferably be variably set in accordance with the vehicle speed V so that they increase as the vehicle speed increases. Notably, the stopping demand is released when it is determined that the preceding vehicle 90 has restarted running.

Figure 4:
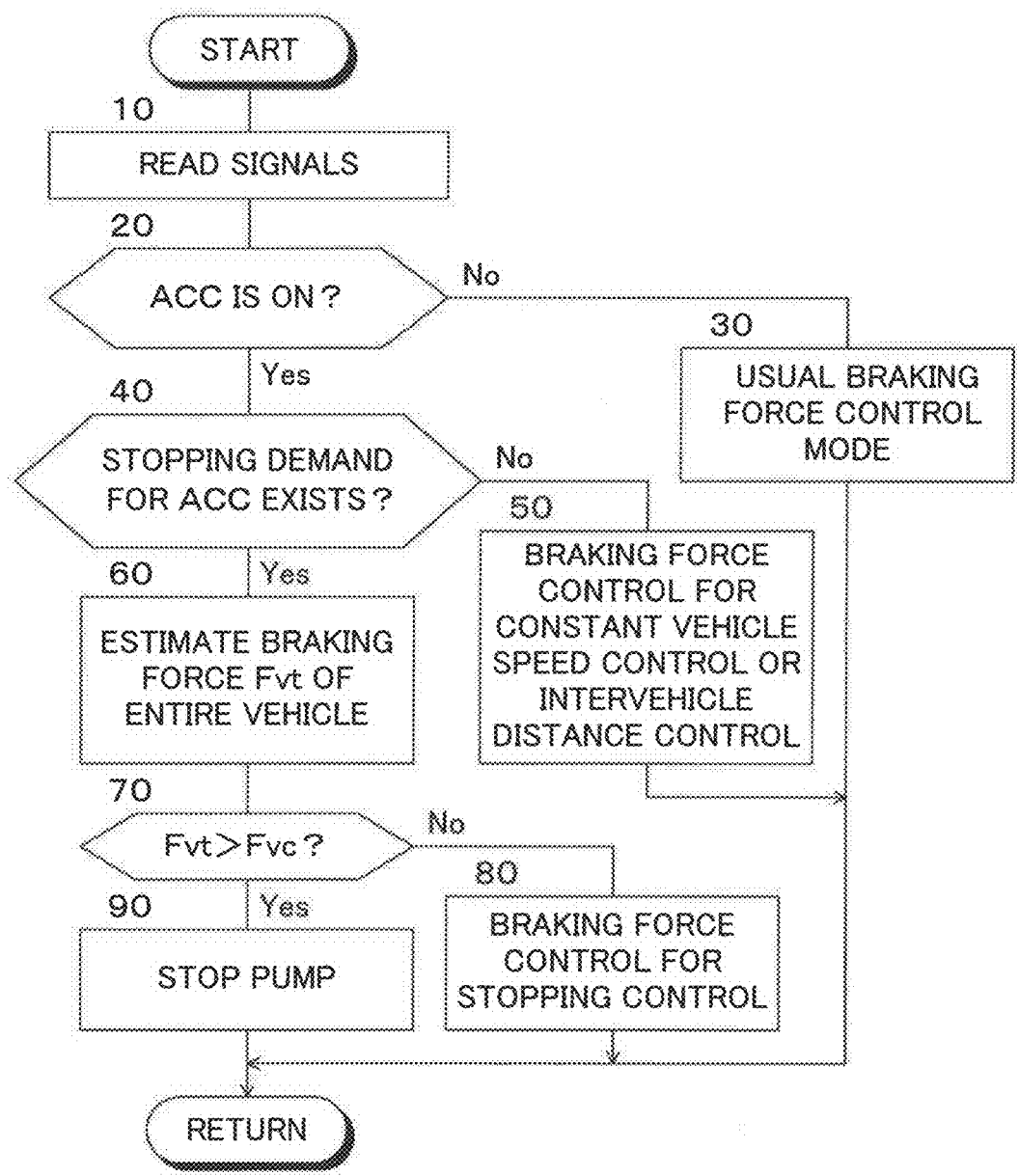
FIG. 4 is a flowchart for illustrating a braking force control routine relating to the inter-vehicle distance control in the embodiment.

The electronic control unit 70 controls the braking forces relating to the inter-vehicle distance control in accordance with the flowchart illustrated in FIG. 4. In particular, the electronic control unit 70, when receiving a braking demand, controls the braking apparatus 14 to increase braking forces of the wheels 12FL-12RR and controls the braking apparatus 14 to end increasing of the braking forces when wheel braking force Fvt of the entire vehicle exceeds a reference value Fvc (a positive constant) (braking force control for stopping control.) The reference value Fvc is a value preset as a braking force for keeping the vehicle 18 in a stopped state.

While not detailed in FIG. 1, the electronic control unit 70, 74 and 86 each include a microcomputer and a drive circuit, and are configured to transmit or receive the necessary information to/from one another. Each microcomputer generally includes a CPU, a ROM, a RAM, and an input and output port device, those components being connected to one another via a bilateral common bus.

Next, a description is given on a control routine for braking force control relating to the inter-vehicle distance control in the embodiment with reference to the flowchart illustrated in FIG. 4. Control in accordance with the flowchart illustrated in FIG. 4 is repeatedly executed at predetermined time periods when an ignition switch (not illustrated in FIG. 1) is on. In the following description, braking force control in accordance with the flowchart illustrated in FIG. 4 is simply referred to as "control".

First, in Step 10, signals, including the signal indicating the master cylinder pressure Pm detected by the pressure sensor 72, are read; and in Step 20, a determination is made as to whether or not the inter-vehicle distance control is being executed based on the signal input from the electronic control unit 74. When an affirmative determination is made, the control proceeds to Step 40, and when a negative determination is made, the control proceeds to Step 30.

In Step 30, the control mode of the braking apparatus 14 is set to the usual braking force control mode. Namely, the braking apparatus 14 is controlled so that braking forces of the wheels 12FL-12RR become braking forces corresponding to the master cylinder pressure Pm.

In step 40, a determination is made as to whether or not a stopping demand is input from the electronic control unit 74. When an affirmative determination is made, the control proceeds to Step 60, and when a negative determination is made, the control proceeds to Step 50.

In Step 50, when a braking demand of the constant vehicle speed control or a braking demand of the inter-vehicle distance control is input from the electronic control unit 74, the braking apparatus 14 is controlled so that braking forces of the wheels 12FL-12RR are increased. When the braking forces are increased, the pumps 62A and 62B are driven, and when increasing of the braking forces are ended, the pumps 62A and 62B are stopped.

In Step 60, a braking force Fa of the right front wheel 12FR and the left rear wheel 12RL is estimated based on a pressure Pa in the brake pressure control line 38A detected by the pressure sensor 64A. A braking force Fb of the left front wheel 12FL and the right rear wheel 12RR is estimated based on a pressure Pb in the brake pressure control line 38B detected by the pressure sensor 64B. In addition, a wheel braking force Fvt of the entire vehicle is computed as the twice of the total Fa+Fb of the braking forces Fa and Fb.

In Step 70, a determination is made as to whether or not the wheel braking force Fvt of the entire vehicle exceeds the reference value Fvc. When an affirmative determination is made, the control proceeds to Step 90. On the other hand, when a negative determination is made, in Step 80, the braking apparatus 14 is controlled to increase the braking forces of the wheels 12FL-12RR so that the wheel braking force Fvt of the entire vehicle increases at the demanded braking force increasing rate ΔFv.

In Step 90, the pumps 62A and 62B are stopped to end increasing of the braking forces of the wheels 12FL-12RR or the pumps are kept in the stopped state.

Figure 5:
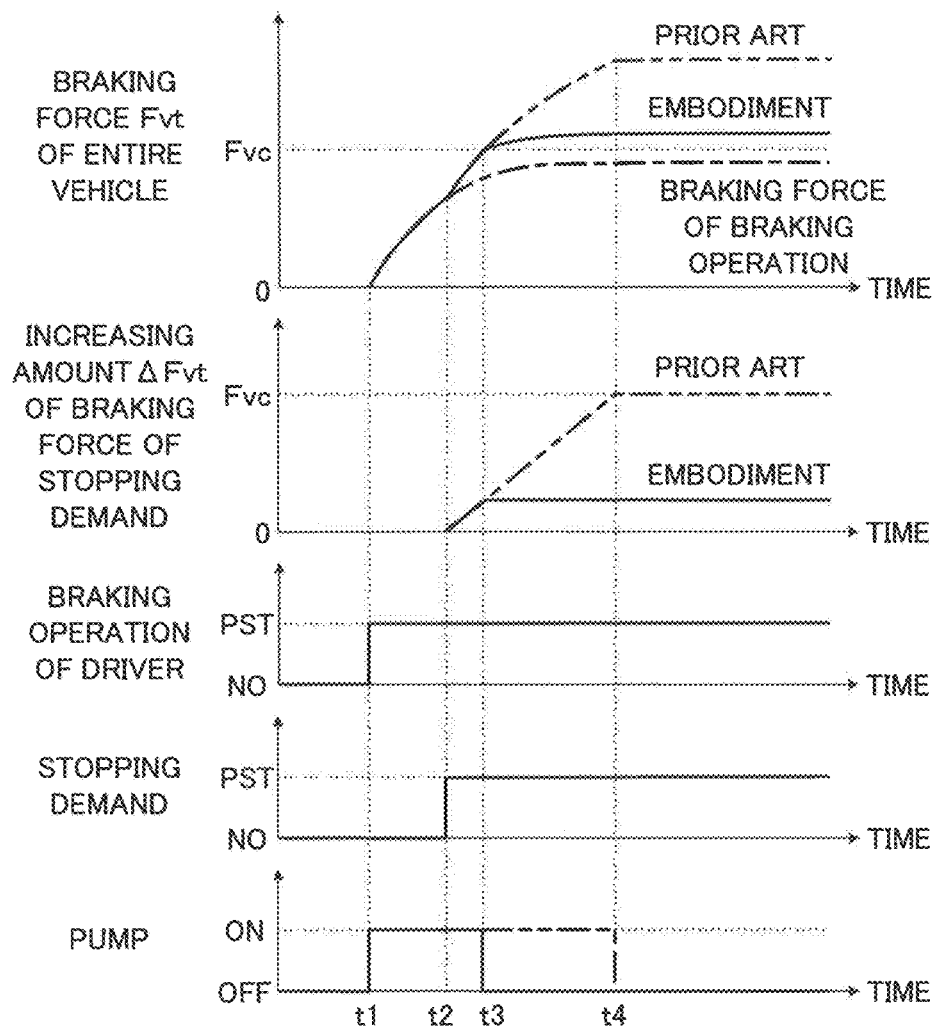
FIG. 5 is a graph illustrating an example of a change of braking force in the embodiment that occurs when the vehicle is stopped in contrast with that in a conventional stopping control device.

FIG. 5 is a graph illustrating an example of a change of braking force in the embodiment that occurs when the vehicle is stopped in contrast with that in a conventional stopping control device (prior art.) Notably, in FIG. 5, "PST" means "PRESENT" and driving and stopping of the pumps 62A and 62B are indicated by "ON" and "OFF", respectively. In FIG. 5, although the reference values of the wheel braking force Fvt of the entire vehicle and increase amount ΔFvt of the braking force are the same value, i.e., Fvc for the sake of convenience in description, they may be different from each other.

Although not illustrated in FIG. 5, assume that at a time point t1 braking operation is started by a driver with the pumps 62A and 62B being accordingly started to be driven, and at a time point t2, the electronic control unit 74 starts outputting braking demand. In addition, assume that at a time point t3, the wheel braking force Fvt of the entire vehicle exceeds the reference value Fvc, and at a time point t4, the increase amount ΔFvt of the braking force becomes the reference value Fvc.

In a conventional stopping control device, at the time point t2, braking force of the wheels of the entire vehicle is started to be increased based on the stopping demand, and driving of the pumps 62A and 62B is maintained and increment of braking forces is maintained until the increase amount ΔFvt of braking force becomes an excessive value that is much higher than the reference value Fvc.

In contrast, according to the embodiment, when the increase amount ΔFvt of braking force exceeds the reference value Fvc at the time point t3, an affirmative determination is made in Step 70 and the pumps 62A and 62B are stopped in Step 90, which ends increasing of the wheel braking force of the entire vehicle based on the stopping demand. Thus, as compared to a conventional stopping control device, the maximum value of the wheel braking force Fvt of the entire vehicle can be decreased, which enables to reduce the oil pressure for generating braking forces of the wheels. Consequently, a risk of generating an operating noise due to flow of oil at very high pressure.

According to the embodiment, the pumps 62A and 62B can be stopped earlier than in a conventional stopping control device. Thus, a time period where the operating noise generates due to driving of the pumps 62A and 62B can be shortened, which also enables to reduce allophone.

While the present disclosure has been described with reference to the above embodiment, it will be apparent to those skilled in the art that the present disclosure is not limited thereto, but may be embodied in various other forms without departing from the scope of the disclosure.

For example, in the above-described embodiment, in Step 60, a wheel braking force Fvt of the entire vehicle is estimated based on pressures detected by the pressure sensors 64A and 64B and in Step 70, a determination is made as to whether or not the wheel braking force Fvt of the entire vehicle exceeds the reference value Fvc. However, as in a situation where braking forces of the wheels are not controlled individually, the braking forces of the left and right wheels are the same as each other and distribution ratio of braking forces between the front and rear wheels is already known, if a braking force of any one of the wheels is estimated, the braking forces of the other wheels and the braking force of the entire vehicle can be estimated. Thus, in Step 60, a braking force of any one of the wheels may be estimated and based on the braking force, braking force of the entire vehicle may be estimated.

In Step 60, a braking force of any one of the wheels may be estimated, and in Step 70, a determination may be made as to whether or not the braking force of that wheel exceeds the reference value Fbc that is set in advance as a braking force of that wheel for keeping the vehicle 18 in the stopped state. In addition, braking forces of the four wheels or a braking force of any one of the wheels may be estimated based on the operation of the pumps 62A and 62B and the operations of the valves such as the on-off valve 48FR.

In the above-described embodiment, the braking apparatus 14 is an accumulator-less braking device that has no accumulator which reserves high pressure oil and that has the electric pumps 62A and 62B which are driven when braking forces are afforded to the wheels. However, the stopping control device according to the present disclosure may be applied to a vehicle that has a braking apparatus having an accumulator.

In the above-described embodiment, the hydraulic circuit 20 is a two-system type hydraulic circuit having X-laid lines that has the first system consists of the right front and left rear wheels and the second system consists of the left front and right rear wheels. However, a hydraulic circuit of a vehicle to which the stopping control device according to the present disclosure is applied may be a two-system type hydraulic circuit having H-laid lines and may be a hydraulic circuit having any structure so long as it can supply high working liquid as necessary to the wheel cylinders of the wheels.

In the above-described embodiment, the control in accordance with the flowchart illustrated in FIG. 4, i.e., the braking force control relating to the inter-vehicle distance control is executed by the electronic control unit 70 for brake control. However, the control may be executed by the electronic control unit 74 for ACC.

In the description concerning the operation of above-described embodiment based on the example illustrated in FIG. 5, increasing of braking forces for the stopping control is started in a situation where braking operation is conducted by a driver. It is to be noted that the same effect as in the example illustrated in FIG. 5 can be attained when braking operation by a driver and increasing of braking forces for the stopping control are started at the same time or when braking operation is started by a driver in a situation where increasing of braking forces for the stopping control is conducted.

What is claimed is:

1. A stopping control device for a vehicle, which is to be applied to a vehicle having a braking apparatus that affords braking forces to respective wheels by supplying high pressure working liquid to wheel cylinders provided on the respective wheels and an inter-vehicle distance controller that controls an inter-vehicle distance between an own vehicle and a preceding vehicle, and comprises:

a braking controller that is configured to:

control the braking apparatus to increase the braking forces afforded to the wheels when a demand for stopping the own vehicle is input from the inter-vehicle distance controller;

control the braking apparatus so that an actual braking force of an entire vehicle becomes a sum of braking forces generated by a braking operation of a driver and increasing braking forces generated by the demand for stopping the own vehicle, and, when it is determined that the actual braking force of the entire vehicle exceeds a reference braking force set in advance as a value for maintaining the own vehicle in a stopped state, maintain the braking forces generated by the demand for stopping the own vehicle at values when the determination is made.

2. The stopping control device for a vehicle according to claim 1, wherein the braking apparatus comprises an electric pump that is configured to pressurize the working liquid, and the braking controller is configured to drive the electric pump when supplying high pressure working liquid to the wheel cylinders and stop the electric pump when ending increasing of the braking forces.

\* \* \* \* \*